US012277855B1

(12) United States Patent
Xiao et al.

(10) Patent No.: US 12,277,855 B1
(45) Date of Patent: Apr. 15, 2025

(54) METHOD FOR SECONDARY DISASTER EARLY WARNING BASED ON GROUND-BASED SAR MONITORING OF DEFORMATION DATA

(71) Applicant: Chengdu University of Technology, Chengdu (CN)

(72) Inventors: Xianxuan Xiao, Chengdu (CN); Guojun Cai, Chengdu (CN); Weixi Shao, Chengdu (CN); Mo Xu, Chengdu (CN); Dongpo Wang, Chengdu (CN); Hui Chen, Chengdu (CN); Jian Huang, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 18/822,264

(22) Filed: Sep. 1, 2024

(30) Foreign Application Priority Data

Mar. 7, 2024 (CN) .......................... 202410257805.8

(51) Int. Cl.
*G08B 31/00* (2006.01)
*G01S 13/90* (2006.01)
*G08B 21/10* (2006.01)
*G08B 21/18* (2006.01)

(52) U.S. Cl.
CPC .......... *G08B 31/00* (2013.01); *G01S 13/9023* (2013.01); *G08B 21/10* (2013.01); *G08B 21/182* (2013.01)

(58) Field of Classification Search
CPC ........ G08B 31/00; G08B 21/12; G08B 21/18; G08B 23/00; G08B 21/00; G01S 13/9029
See application file for complete search history.

(56) References Cited

U.S. PATENT DOCUMENTS

2014/0227033 A1 * 8/2014 Scheel ...................... E02B 3/18
405/195.1

FOREIGN PATENT DOCUMENTS

EP         2017647 A1 *  1/2009  ......... G01S 13/9023
WO  WO-2008125929 A2 * 10/2008  ......... G01S 13/9023

* cited by examiner

*Primary Examiner* — Mirza F Alam
(74) *Attorney, Agent, or Firm* — Central California IP Group, P.C.; Andrew D. Fortney

(57) ABSTRACT

A secondary disaster early warning method based on ground-based SAR monitoring of deformation data includes (1) real-time monitoring of a secondary disaster unstable area through ground-based SAR to obtain deformation monitoring data; (2) constructing a displacement-time curve generated by the secondary disaster unstable area over time; setting a monitoring period, and based on the displacement-time curve, constructing a displacement change triangular area model; (3) based on the displacement change triangular area model, constructing an area-time curve, and obtaining the area-time curve change trend and the displacement triangular area in the displacement-time curve according to the monitoring period; (4) dividing the secondary disaster development process into an initial deformation stage, a constant velocity deformation stage, and an accelerated deformation stage; (5) setting early warning levels corresponding to each stage for phased secondary disaster early warning; and (6) quickly and comprehensively identifying the secondary disaster development stage and deformation evolution trend.

4 Claims, 7 Drawing Sheets

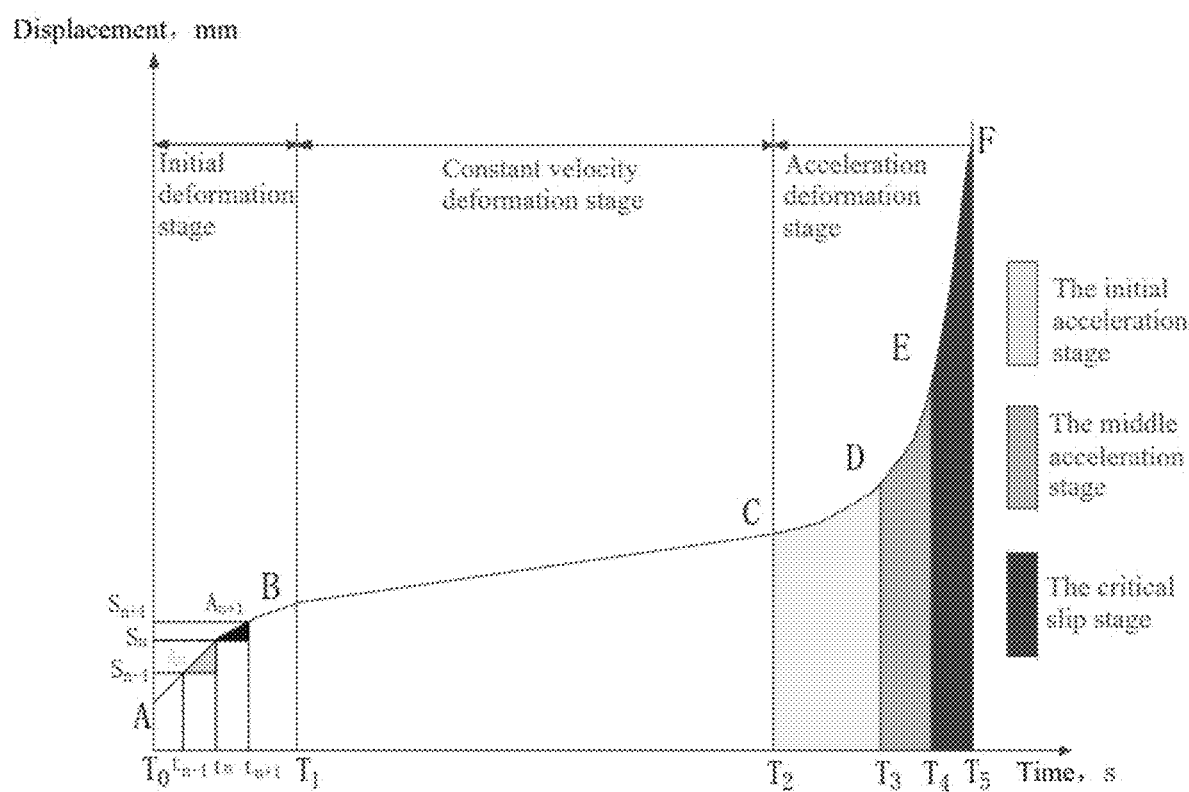
Fig.2 Accumulated deformation and evolutionary stage division of unstable masses

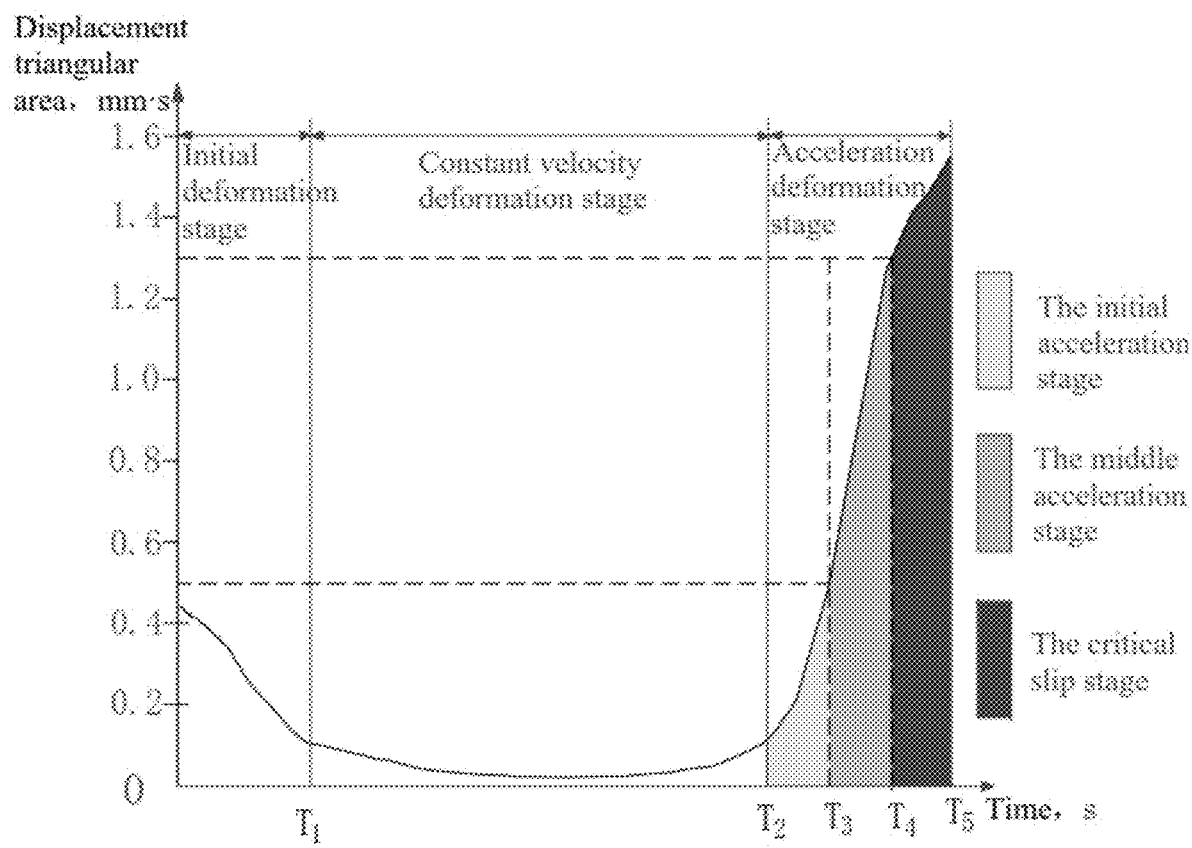
Fig.3 Deformation curve area per cycle and stage division diagram

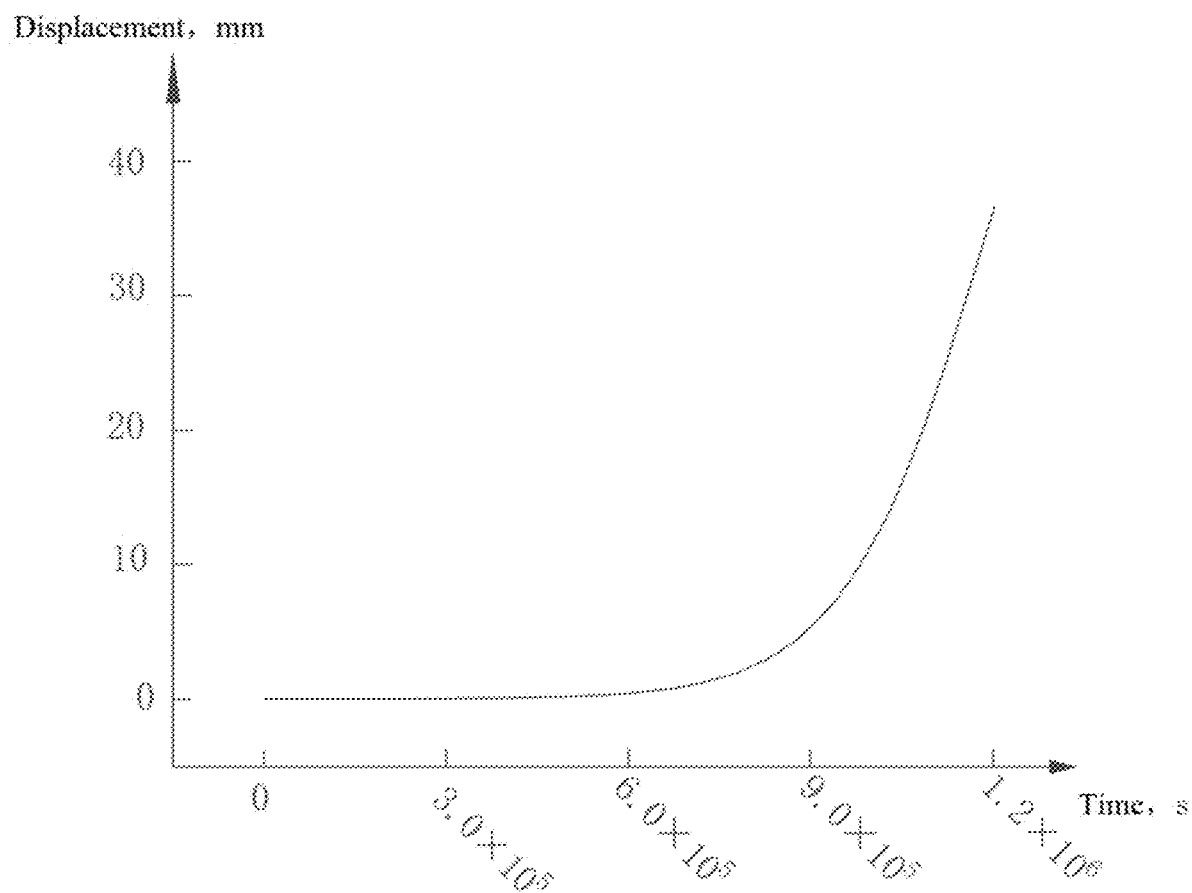
Fig.4 Cumulative displacement change map of landslide monitoring of Example 1

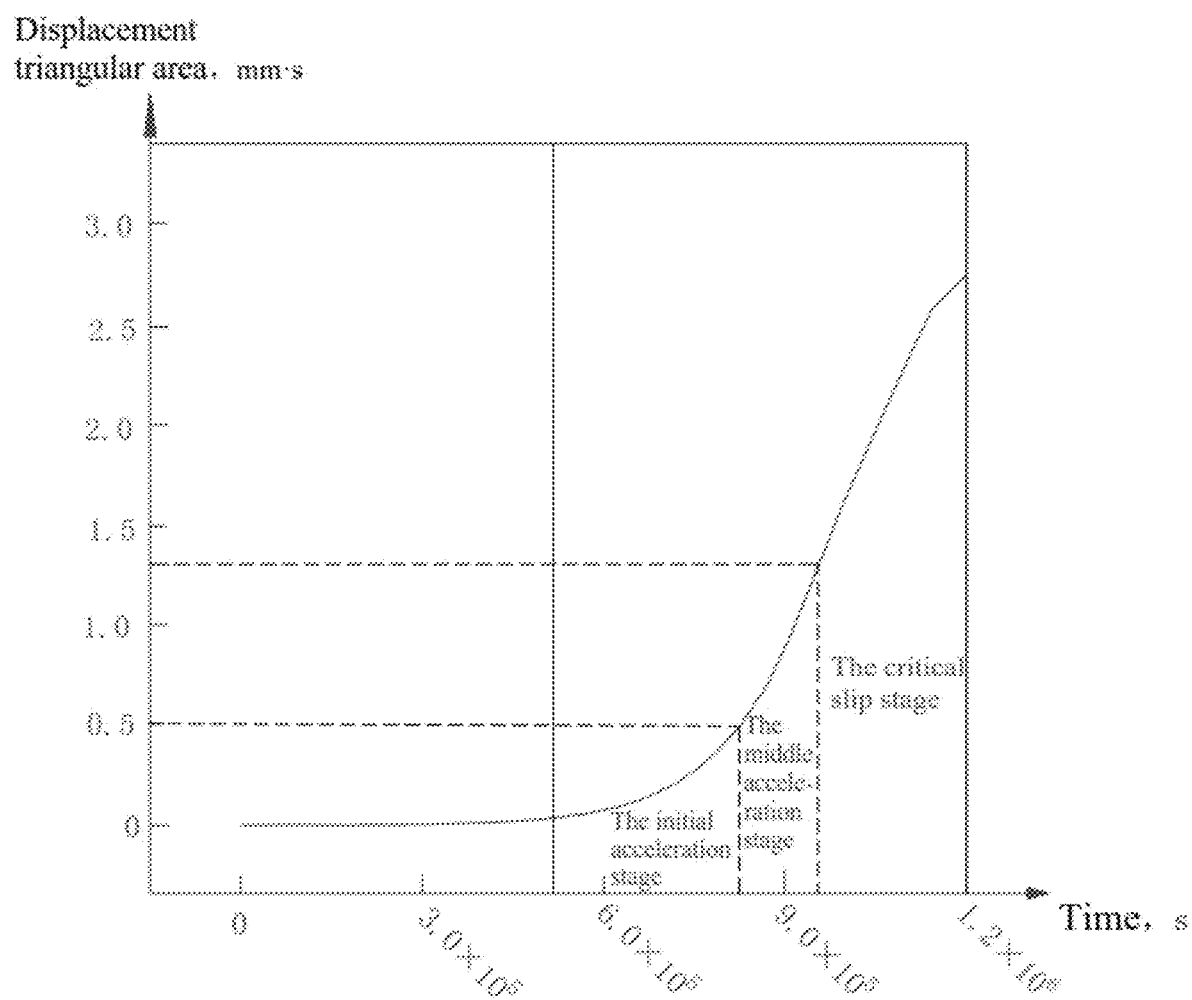
Fig.5 Slope curve area per cycle and stage division graph of Example 1

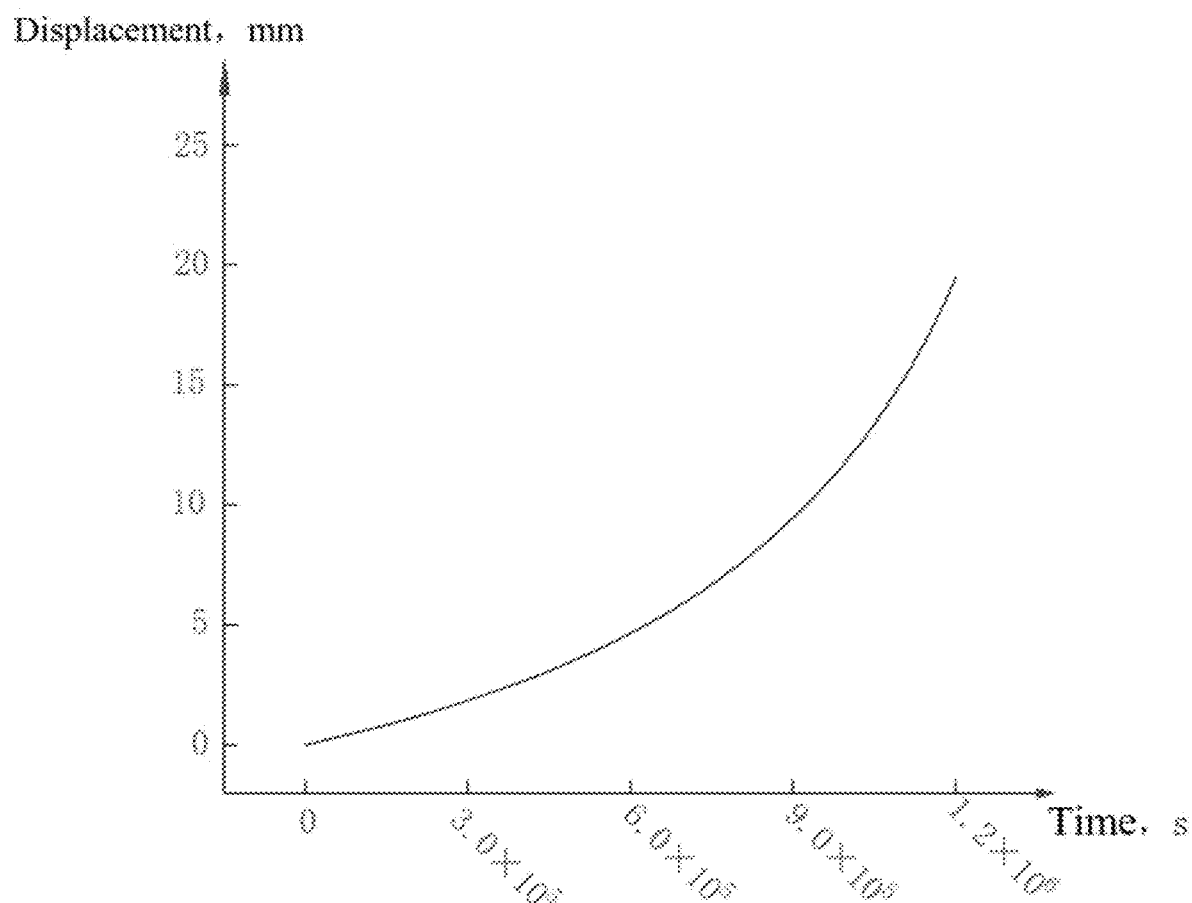
Fig.6 Cumulative displacement change map of landslide monitoring of Example 2

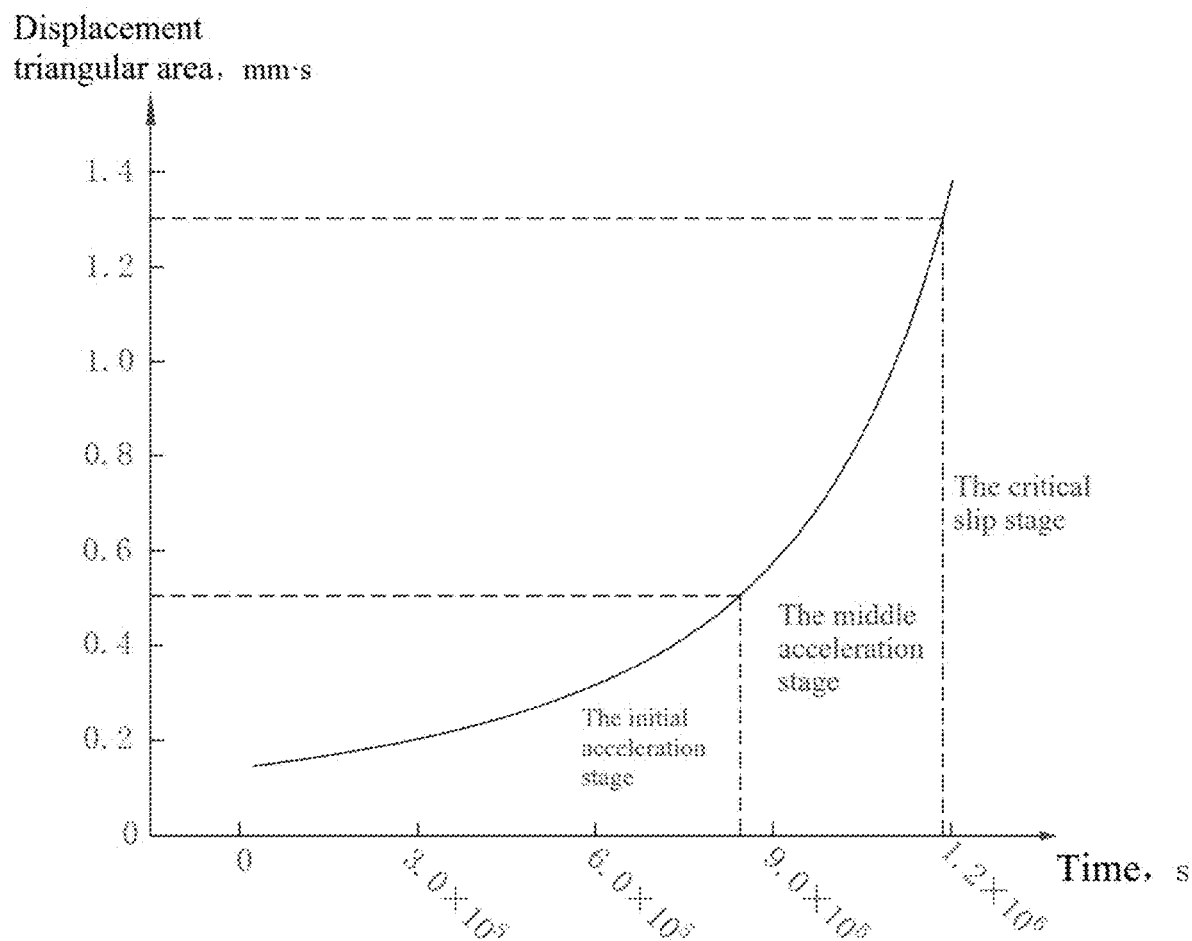
Fig.7 Slope curve area per cycle and stage division graph of Example 2

METHOD FOR SECONDARY DISASTER EARLY WARNING BASED ON GROUND-BASED SAR MONITORING OF DEFORMATION DATA

CROSS-REFERENCE TO RELATED APPLICATIONS

This application claims the benefit of Chinese Pat. Appl. No. 202410257805.8, filed on Mar. 7, 2024, incorporated herein by reference as if fully set forth herein.

FIELD OF THE INVENTION

The invention belongs to the field of geohazard warning technology and particularly concerns a secondary disaster warning method based on ground-based SAR monitoring deformation data.

BACKGROUND TECHNOLOGY

Mountainous terrains are characterized by steep slopes, deep valleys, and active structures. Under the influence of long-term geological forces and external dynamic actions, slopes are prone to sudden, high-level, and highly concealed geological disasters. After secondary disasters such as landslides and collapses, there is often a risk of further sliding and collapse, which complicates the rescue efforts following the initial occurrence of landslides or collapses and constantly threatens the safety of emergency personnel and equipment. Current common secondary disaster warning identification criteria are primarily based on the three-stage deformation characteristics, establishing warning models such as displacement, inverse velocity, acceleration, tangent angle, and improved tangent angle. However, the concealed and sudden nature of the secondary deformation of landslides, coupled with the reliance on a large number of landslide cases for the development of the above warning models, often leads to false positives and missed reports when using these models for new secondary geological disaster warnings, thereby preventing accurate secondary geological disaster warnings. Although ground-based SAR (Synthetic Aperture Radar) monitoring data has high precision, when facing danger zones where geological disasters have occurred, the timely installation of such monitoring equipment is often impractical. Moreover, secondary disasters can severely affect the acquisition of landslide deformation data, preventing monitoring equipment from detecting the complete process of deformation and destruction in unstable areas. As a result, the obtained displacement curve may lack the complete three deformation stages, making it impossible to judge the deformation and evolution trends of landslides, and further leading to the delay in the issuance of warning information, which severely threatens the safety of on-site emergency response personnel. Existing geological disaster warning methods are unable to get the disaster body's pre-warning information in emergency scenarios, achieving comprehensive monitoring and real-time warning of landslides and collapses at the disaster site.

SUMMARY OF THE INVENTION

To address the shortcomings of the existing technology mentioned above, the present invention provides a secondary disaster warning method based on ground-based SAR monitoring deformation data. This method is based on the on-site monitoring data of ground-based SAR, and analyzes and warns by deepening the processing of the data obtained from ground-based SAR. It uses the change trend of the curve area of displacement and time for analysis and warning, achieving more accurate, direct and effective warnings of secondary geological disasters. This solves the problem of being unable to quickly and comprehensively judge and recognize the development stage and deformation evolution trend(s) of secondary disasters.

To achieve the aforementioned invention objectives, the technical solution adopted by this invention is as follows:

This invention provides a secondary disaster warning method based on ground-based SAR monitoring deformation data, including the following steps:

S1, monitor an unstable area of a secondary disaster in real-time using ground-based SAR to obtain deformation monitoring data;

S2, based on the deformation monitoring data, obtain a displacement curve of the unstable area of the secondary disaster over time, and use it as a displacement-time curve;

S3, set a monitoring period, and based on the displacement-time curve, construct a displacement change triangular area model;

S4, construct an area-time curve based on the displacement change triangular area model, and obtain one or more change trends of the area-time curve and a displacement triangular area in the displacement-time curve according to the monitoring period;

S5, divide a development process of the secondary disaster into an initial deformation stage, a constant velocity deformation stage, and an acceleration deformation stage based on the change trend(s) of the area-time curve and the displacement triangular area;

S6, set corresponding secondary disaster early warning levels for the initial deformation stage, the constant velocity deformation stage, and the acceleration deformation stage based on the area-time curve; and S7, perform secondary disaster early warning in a phased manner based on the early warning levels of the secondary disaster.

The beneficial effects of the present invention are as follows. The present invention provides a secondary disaster early warning method based on ground-based SAR monitoring of deformation data. This method monitors in real-time the deformation data from one or more unstable areas of secondary disasters using ground-based SAR, and constructs a displacement-versus-time curve based on the deformation monitoring data. By setting monitoring periods for the displacement-versus-time curve, a displacement triangular area model is established, and the displacement triangular area(s) corresponding to each monitoring period are delineated. The development process of the secondary disasters is divided into three stages based on the displacement triangular area and the slope of the area-versus-time curve, with one or more corresponding warning levels set for each stage. Notably, the alarm level is further subdivided into three levels for the accelerated deformation stage. The invention can comprehensively and rapidly identify the development stages of secondary disasters with accuracy, fully reflecting the deformation evolution trend of the unstable areas. At the same time, it can provide field rescue personnel with accurate early warning signals to ensure their safety.

Furthermore, the step S1 may include the following sub-steps:

S11, delineate the unstable area(s) of the secondary disaster;

S12, install ground-based SAR with the unstable area(s) of the secondary disaster as the monitoring target;

S13, use the ground-based SAR to monitor the unstable area(s) of the secondary disaster in real-time and obtain the deformation monitoring data.

The beneficial effects of adopting the above further scheme are: this invention delineates the unstable regions prone to secondary disasters, and sets up ground-based SAR for real-time monitoring with the unstable regions as the monitoring targets. This allows for the acquisition of deformation monitoring data at the target location, providing a data foundation for in-depth analysis of the deformation monitoring data to comprehensively and rapidly identify the development stages of secondary disasters.

Furthermore, the step S3 may include the following sub-steps:

S31: Establish a monitoring period for the ground-based SAR in the unstable area(s) of the secondary disaster;

S32: Based on the displacement-time curve, obtain a cumulative displacement of the unstable area(s) of the secondary disaster within each monitoring period;

S33: Construct a displacement increment model based on the cumulative displacement of the unstable area(s) of the secondary disaster within each monitoring period;

S34: Based on the displacement increment model, construct the displacement change triangular area model.

The beneficial effects of using the above further scheme are: this invention sets a monitoring period for secondary disaster unstable areas, so as to facilitate the analysis of displacement-time curves for different monitoring periods, and to provide a basis for dividing the development stages of secondary disasters based on the deformation rate and acceleration of the secondary disaster unstable areas.

Furthermore, the displacement increment model may be calculated as follows:

$$\Delta S_n = S_n - S_{n-1}$$

wherein ($\Delta S_n$) represents the incremental displacement of the secondary disaster unstable area within an n-th monitoring period, Sn denotes the cumulative displacement of the secondary disaster unstable area monitoring period by the time n, and $S_{n-1}$ represents a displacement increment of the secondary disaster unstable area within the (n−1)th monitoring period.

The beneficial effects of adopting the above further solution are: this invention provides a calculation method for the displacement increment model, which can calculate the displacement deformation of the secondary disaster body within each monitoring period. It can reflect the deformation rate of the unstable area of the secondary disaster as, or identically to, the curve slope and also provide a basis for calculating the displacement triangle area.

The displacement change triangular area model may be calculated as follows:

$$A_n = \frac{1}{2} \Delta S_n (t_n - t_{n-1})$$

where $A_n$ represents the triangular area of the displacement change within the n-th monitoring period, $t_n$ denotes the end of the n-th monitoring period, and $t_{n-1}$ represents the end of the (n−1)th monitoring period.

The beneficial effects of the above-described further embodiment are: the present invention provides a calculation method for the displacement change triangular area model. Since the rate of change of displacement may vary, the change of displacement triangular area can reflect the deformation acceleration of the unstable area of secondary disasters. Based on the law of change of displacement triangular area, it can provide a basis for accurately dividing the development stage of secondary disasters.

Furthermore, the step S5 may include the following sub-steps.

S51: Calculate the displacement triangular area within each monitoring period for the displacement-time curve, as well as the slope of the displacement-time curve. Use the displacement triangular area and the slope of the time-displacement curve as the secondary disaster deformation rate. Here, the slope of the displacement-time curve corresponds to the change trend of the area-time curve.

S52: When the displacement triangular area is greater than a first displacement triangular area threshold, and the change trend of the secondary disaster deformation rate is from small to large and then to small, the displacement-time curve and a corresponding part of the area-time curve are considered as the initial deformation stage.

S53: When the displacement triangular area is less than the first displacement triangular area threshold, the change trend of the secondary disaster deformation rate is considered unchanged, and the displacement-time curve and the corresponding part of the area-time curve are regarded as the uniform deformation stage.

S54: When the displacement triangular area is greater than the first displacement triangular area threshold, and the change trend of the secondary disaster deformation rate is gradually increasing until it approaches a vertical state, then the displacement-time curve and the corresponding part of the area-time curve are defined as the accelerated deformation stage.

The beneficial effects of the above-described further embodiment are: the present invention provides a specific method based on the change trend and displacement of the area-time curve, which divides the secondary disaster development process into an initial deformation stage, a constant velocity deformation stage, and an accelerated deformation stage, achieving an accurate three-stage division of secondary disaster development. This provides a basis for issuing warnings of different levels of importance.

Furthermore, the step S6 may include the following sub-steps.

S61. According to the area-time curve, set the secondary disaster early warning level corresponding to the initial deformation stage as the attention level T1.

S62. According to the area-time curve, set the secondary disaster early warning level corresponding to the constant velocity deformation stage as the warning level T2.

S63. According to the area-time curve, obtain the displacement triangular area within each monitoring period in the accelerated deformation stage.

S64. When the displacement triangular area in the accelerated deformation stage is less than a second displacement triangular area threshold, consider the corresponding part of the area-time curve as the initial acceleration stage, and set the corresponding secondary disaster early warning level as a first alarm level T3.

S65. When the displacement triangular area in the accelerated deformation stage is greater than the second displacement triangular area threshold, but less than a third displacement triangular area threshold, consider the corresponding part of the area-time curve as the middle acceleration stage, and set the corresponding secondary disaster early warning level as a second alarm level T4.

S66. When the displacement triangular area in the accelerated deformation stage is greater than the third displacement triangular area threshold, consider the corresponding part of the area-time curve as a critical slip stage, and set the corresponding secondary disaster early warning level as a third alarm level T5.

The beneficial effects of the above-described further embodiment are: this invention provides a method for setting secondary disaster warning levels based on the area-time curve, combined with the initial deformation stage, constant speed deformation stage, and acceleration deformation stage, respectively. By setting corresponding warning levels at different stages, especially further dividing the acceleration deformation stage into three stages, it is possible to achieve real-time and accurate warning based on the severity of disaster occurrence.

Compared with existing technologies, the present invention has the following advantages.

The invention does not require complete deformation monitoring data of the secondary disaster unstable area during the monitoring process. Instead, it only needs to construct a displacement-time curve based on available or already-obtained deformation monitoring data. Then, it can use the displacement change triangular area model to judge the deformation evolution trend, classify the secondary disaster development process, and set the secondary disaster early warning level. This enables a rapid entry into the monitoring and early warning state in accordance with the actual specific circumstances of on-site rescue and disaster relief, achieving real-time rapid warning. Therefore, the invention can realize rapid analysis and identification of the current stage of secondary disaster development, thereby overcoming the difficulties in rapidly obtaining the deformation evolution trend of secondary disasters during the early warning and monitoring process of ground-based SAR. These difficulties are caused by the hasty rescue time after the first disaster, the long deployment time of monitoring instruments during secondary disaster monitoring, and the sudden and hidden nature of secondary disasters. This provides accurate pre-judgment for the first-line decision-makers.

The advantages of the present invention that have not been addressed will be further analyzed in subsequent embodiments.

BRIEF DESCRIPTION OF THE DRAWINGS

For a more detailed explanation of the technical solutions of the embodiments of the present invention, a simple introduction to the figures for the embodiments will be provided below. It should be understood that the following figures only illustrate certain embodiments of the present invention and should not be considered as limiting the scope. For professionals in the field, without the need for creative labor, other related figures can be derived based on these figures.

FIG. 2 is a schematic diagram illustrating the displacement-time curve in Example 1 of this invention.

FIG. 3 is a schematic diagram illustrating the area-time curve in Example 1 of this invention.

FIG. 4 is a schematic diagram illustrating the displacement-time curve in Example 2 of this invention.

FIG. 5 is a schematic diagram illustrating the area-time curve in Example 2 of this invention.

FIG. 6 is a schematic diagram illustrating the displacement-time curve in Example 3 of this invention.

FIG. 7 is a schematic diagram illustrating the area-time curve in Example 3 of this invention.

DETAILED DESCRIPTION

Figure 1:
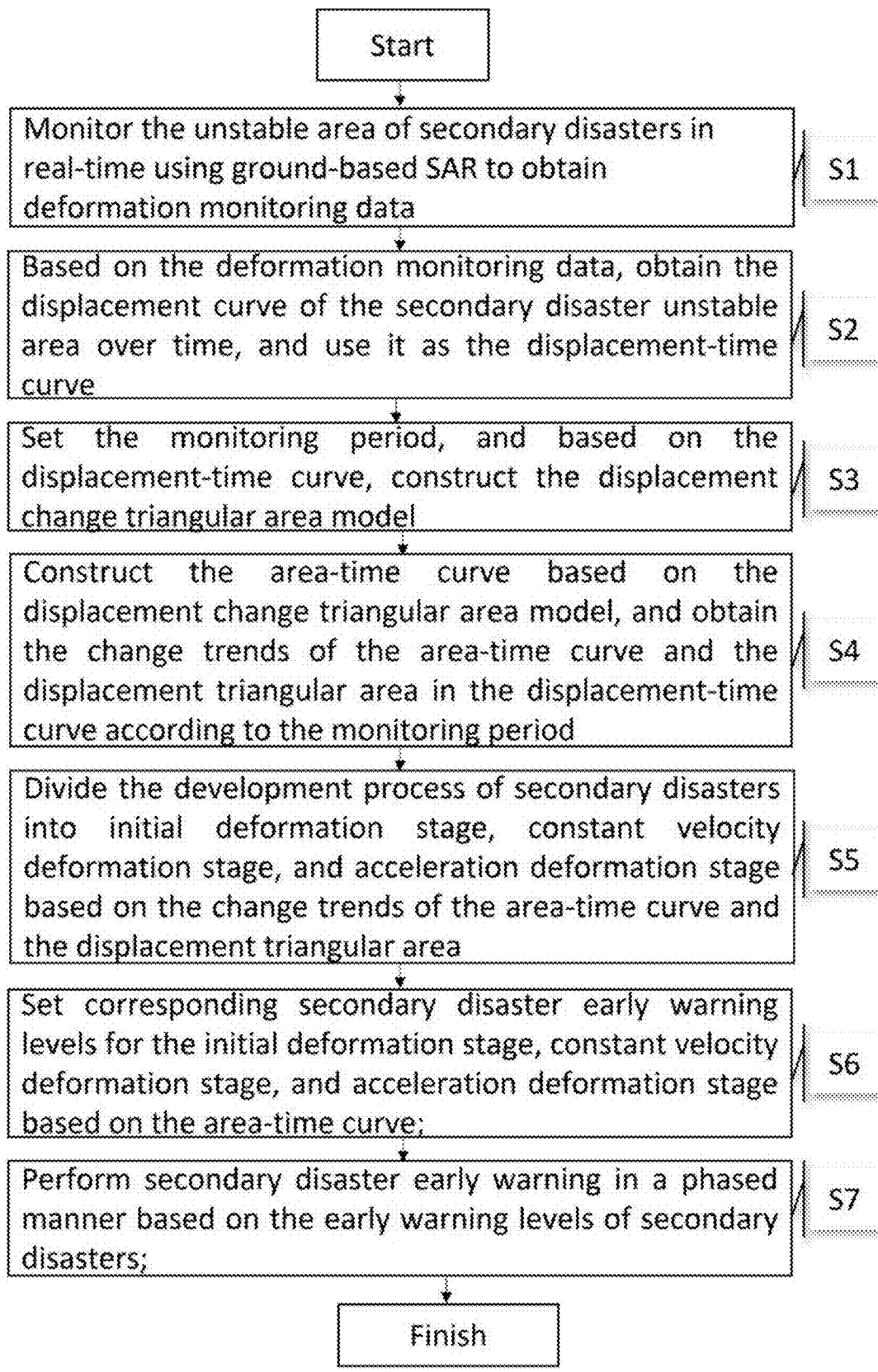
FIG. 1 is a flowchart illustrating the steps of a secondary disaster warning method based on ground-based SAR monitoring of deformation data in Example 1 of this invention.

Below, with reference to the drawings of embodiments of the present invention, the technical solutions of the embodiments of the present invention will be described clearly and completely. Evidently, the described embodiments are merely a part of the examples of the present invention, rather than all of them. Typically, the components of embodiments of the present invention shown and described in the drawings can be arranged and designed in various configurations. Therefore, the detailed description of the embodiments of the present invention provided in the drawings is not intended to limit the scope of the present invention to be protected, but merely represents selected embodiments of the present invention. Based on the embodiments of the present invention, all other examples obtained by technicians in the field without creative work belong to the scope of the present invention.

Implementation Example 1

In one example of the present invention, as shown in FIG. 1, a secondary disaster early warning method based on ground-based SAR monitoring of deformation data may include the following steps.

S1, monitor the unstable area of the secondary disaster in real-time using ground-based SAR to obtain deformation monitoring data.

S1 may include the following steps:

S11, delineate one or more unstable areas of the secondary disaster;

S12, install ground-based SAR with the unstable areas of the secondary disaster as the monitoring target;

S13, use the ground-based SAR to monitor the unstable areas of the secondary disaster in real-time and obtain deformation monitoring data. The ground-based SAR in acquiring deformation monitoring data operates on the principle of a remote monitoring system based on microwave interferometry, which combines step frequency continuous wave technology, synthetic aperture radar technology, and differential interferometric measurement technology. It divides the unstable areas of the secondary disaster into numerous small pixel units. Then, it acquires deformation information of the monitoring targets by measuring the phase difference of electromagnetic waves from each pixel unit between two consecutive observations, thus composing the deformation monitoring data.

S2, based on the deformation monitoring data, obtain the displacement curve of the secondary disaster unstable area over time, and use it as the displacement-time curve. In this example, based on deformation monitoring data, the cumulative displacement S of the monitoring target obtained by ground-based SAR at different moments is plotted as a relationship curve with time T; that is, a displacement-time curve, such as that shown in FIG. 2. The method of constructing the displacement-time curve may include the following steps.

A1, based on the monitoring data of deformation, the cumulative displacement S of the monitoring target is imported into a table along with the corresponding time T, and the time T is associated with the cumulative displacement S through the table.

A2, take time T as the horizontal axis and cumulative displacement S as the vertical axis, draw a scatter plot with smooth curves and data markers, and use it as the initial displacement versus time curve graph.

A3, perform decimation processing on the displacement-time curve graph to optimize the curve. The displacement-time curve reflects the displacement changes of the secondary disaster-unstable area within a certain period of time. Due to the randomness of the equipment installation time and the sudden nature of secondary disasters, the actual obtained displacement-time curve may not fully reflect the complete deformation stages of the secondary disaster-unstable area.

S3, set the monitoring period, and based on the displacement-time curve, construct the displacement change triangular area model.

S3 may include the following steps:

S31: Establish a monitoring period for the ground-based SAR in the unstable area(s) of the secondary disaster. In one example, the monitoring period for the unstable area(s) of the secondary disaster is set to 30 minutes, i.e., 1800 seconds.

S32: Based on the displacement-time curve, obtain the cumulative displacement of the unstable area(s) of the secondary disaster within each monitoring period.

S33: Construct a displacement increment model based on the cumulative displacement of the unstable area(s) of the secondary disaster within each monitoring period.

The calculation expression of the displacement increment model is as follows:

$$\Delta S_n = S_n - S_{n-1}$$

wherein ($\Delta S_n$) represents incremental displacement of the secondary disaster unstable area within an n-th monitoring period, Sn denotes the cumulative displacement of the secondary disaster unstable area monitoring period by the time n, and $S_{n-1}$ represents the displacement increment of the secondary disaster unstable area within the (n−1)th monitoring period.

S34: Based on the displacement increment model, construct a displacement change triangular area model.

The calculation expression of the displacement change triangular area model is as follows:

$$A_n = \frac{1}{2}\Delta S_n(t_n - t_{n-1})$$

where, $A_n$ represents the triangular area of displacement change within the n-th monitoring period, $t_n$ denotes the end of the n-th monitoring period, and $t_{n-1}$ represents the end of the (n−1)th monitoring period.

S4, construct the area-time curve based on the displacement change triangular area model, and obtain the change trend(s) of the area-time curve and the displacement triangular area in the displacement-time curve according to the monitoring period.

As illustrated in FIG. 2, within each monitoring period, the displacement triangular area formed by the displacement change quantity and time for each monitoring period is considered as the corresponding displacement triangular area for that monitoring period. Due to the different rates of change in the displacement in the secondary disaster unstable area(s) between adjacent and continuous monitoring periods, the displacement triangular areas exhibit distinct differences. The law of variation of displacement triangular areas over time can be utilized to delineate and accurately identify the deformation rate and evolution trend of the secondary disaster unstable area(s). The vertical axis represents displacement, measured in millimeters (mm), and the horizontal axis represents monitoring time, measured in seconds(s).

S5, divide the development process of the secondary disaster into an initial deformation stage, a constant velocity deformation stage, and an acceleration deformation stage based on the change trend(s) of the area-time curve and the displacement triangular area(s).

S5 may include the following steps:

S51: Calculate the displacement triangular area within each monitoring period for the displacement-time curve, as well as the slope of the displacement-time curve. Use the area and the slope of the time-displacement curve as the secondary disaster deformation rate. Here, the slope of the displacement-time curve corresponds to the change trend of the area-time curve.

S52: When the displacement triangular area is greater than a first threshold, and the change trend of the secondary disaster deformation rate is from small to large and then to small, the displacement-time curve and the corresponding part of the area-time curve are considered as the initial deformation stage (FIG. 2). In this implementation example, the first threshold is 0.1 mm·s, which indicates that the time-space interval of the secondary disaster unstable area in the monitoring period reached 0.1 mm·s or greater.

S53: When the displacement triangular area is less than the first threshold, and the change trend of the secondary disaster deformation rate is substantially unchanged, the displacement-time curve and the corresponding part of the area-time curve are regarded as the uniform deformation stage.

S54: When the displacement triangular area is greater than the first threshold, and the change trend of the secondary disaster deformation rate is gradually increasing until it approaches a vertical state, then the displacement-time curve and the corresponding part of the area-time curve are defined as the accelerated deformation stage.

As shown in FIG. 2, the initial deformation stage corresponds to the AB segment in the displacement-time curve graph. The initial deformation stage gradually occurs during the initial deformation of the slope, with obvious cracks appearing in the slope body. Under the action of external forces and self-weight, these cracks gradually become compacted. The displacement-time curve initially exhibits a large slope, which gradually decreases over time. In the AB segment part of the displacement-time curve, there exists an inflection point, where the slope is the maximum, indicating that the secondary disaster body in the unstable region of secondary disasters undergoes relatively large deformation rates due to the action of external forces and self-weight. After the cracks are compacted, the deformation rate gradually decreases, and the slope of the displacement-time curve also gradually decreases, manifesting the characteristics of decelerated deformation. That is, the trend of the deformation rate during the initial deformation stage presents a pattern of increasing or at least remaining constant, then decreasing, and the displacement-time curve exhibits an upwardly curved (e.g., concave or convex) shape until it reaches point B, where it has the minimum slope during the initial deformation stage.

In the displacement-time curve, the uniform deformation stage corresponds to the BC segment. During the uniform deformation stage, the unstable area of the secondary disaster such as a geologic slope or body continues to deform at a uniform speed under the action of gravity. However, due to the sliding force generated by external forces and its own weight, and the friction resistance from the sliding bed at the bottom of the unstable area and the sliding force and friction resistance are approximately equal. As a result, the deformation of the secondary disaster body shows a uniform deformation, which is represented by a slightly slanted, but substantially straight line in the displacement-time curve with a generally constant slope. The deformation rate of the secondary disaster also remains largely unchanged, with the acceleration close to zero, until the time reaches point C.

In the displacement and curve graph, the accelerated deformation stage corresponds to the CF segment. With the continuous deformation of the secondary disaster unstable area, when the friction force at the bottom of the secondary disaster body is less than the sliding force caused by external force and its own weight, deformation of the secondary disaster body gradually accelerates. During this process, the deformation rate of the secondary disaster gradually increases, showing a continuously growing trend. The displacement-time curve presents a curved (e.g. U or "hockey stick") shape. When the unstable area is about to collapse, the curve approaches a vertical state (i.e., its slope becomes very large), and the deformation rate and acceleration of the secondary disaster are very large. In this embodiment, according to the different magnitude of acceleration (i.e., the increase [s] in the displacement triangle area) in the accelerated deformation stage, this stage can be further divided into an initial acceleration stage, a medium acceleration stage, and a sliding stage. Among them, the initial acceleration stage corresponds to the CD segment, the medium acceleration stage corresponds to the DE segment, and the sliding stage corresponds to the EF segment.

S6, set corresponding secondary disaster early warning levels for the initial deformation stage, constant velocity deformation stage, and acceleration deformation stage based on the area-time curve;

As shown in FIG. 3, the vertical axis represents the displacement triangular area, measured in mm·s, and the horizontal axis represents time, measured in seconds(s). The interval from 0 to T1 corresponds to the initial deformation stage, during which the trend in the secondary disaster deformation rate changes from small to large and then back to small. This is reflected in the area-time curve as a descending trend, presenting a curve with at least one inverted U-shaped segment. The interval from $T_1$ to T2 corresponds to the constant velocity deformation stage, where the trend in the secondary disaster deformation rate remains relatively stable, which is manifested in the area-time curve as a relatively flat, nearly horizontal line. The interval from T2 to $T_5$ corresponds to the accelerating deformation stage, where the trend in the secondary disaster deformation rate gradually increases until it approaches a vertical state. This is reflected in the area-time curve as an ascending trend, showing a curve with at least one an inverted U-shaped segment (e.g., T3-T5) and optionally, at least one U-shaped segment (e.g., T2-T3). In the critical sliding stage, the accelerating deformation stage is further divided based on different displacement triangular areas or rates of change therein. This includes the initial acceleration stage (T2 to T3), the middle acceleration stage (T3 to T4), and the critical sliding acceleration stage (T4 to T5).

S6 may include the following steps:

S61. According to the area-time curve, set the secondary disaster early warning level corresponding to the initial deformation stage as the attention level T1.

S62. According to the area-time curve, set the secondary disaster early warning level corresponding to the constant velocity deformation stage as the warning level T2.

S63. According to the area-time curve, obtain the displacement triangular area within each monitoring period in the accelerated deformation stage.

S64. When the displacement triangular area in the accelerated deformation stage is less than a second threshold, consider the corresponding part of the area-time curve as the initial acceleration stage, and set the corresponding secondary disaster early warning level as a first alarm level T3. In this implementation example, the second threshold is 0.5 mm-s, which indicates that the time-space interval of the secondary disaster unstable area in the monitoring period has reached 0.5 mm·s or greater.

S65. When the displacement triangular area in the accelerated deformation stage is greater than the second threshold but less than a third threshold, consider the corresponding part of the area-time curve as the middle acceleration stage, and set the corresponding secondary disaster early warning level as a second alarm level T4. In this implementation example, the third threshold is 1.3 mm·s, which indicates that the time-space interval of the secondary disaster unstable area in the monitoring period is greater than 0.5 mm·s, but has not yet reached 1.3 mm·s.

S66. When the displacement triangular area in the accelerated deformation stage is greater than the third threshold, consider the corresponding part of the area-time curve as the critical slip stage, and set the corresponding secondary disaster early warning level as a third alarm level T5.

S7, perform secondary disaster early warning in a phased manner based on the early warning levels of secondary disasters.

In this implementation example, when the early warning level is set to Level T1 (caution), signage indicating "Landslide Danger Zone, Observe Passage" or a message similar thereto should be erected in villages and along highways within the threat range of the secondary disaster(s), for warning identification. For Level T2 (warning), group monitoring should be enhanced (e.g., by the community), continuously observing the rainfall, wall cracks, and ground fissures in the unstable area(s) of the secondary disaster. At Level T3 (first alarm), a blue alert or similar alarm should be issued from the disaster relief and rescue center to warn threatened objects and prepare people for evacuation. At Level T4 (second alarm), an orange alert or similar alarm should be issued from the disaster relief and rescue center to warn threatened objects and prepare people ready for immediate evacuation. At Level T5 (third alarm), a red alert or similar alarm should be issued from the disaster relief and rescue center to warn threatened objects, and immediate evacuation should be initiated.

In this implementation example, if the deformation monitoring data obtained is not sufficient to evolve the complete deformation situation of the secondary disaster unstable area, using the actual obtained deformation monitoring data to construct displacement-time curves, triangular area models, and area-time curves successively can still accurately classify and warn others of the actual situation of the secondary disaster unstable area according to time periods through S5 and S6, thereby ensuring the safety of rescue personnel.

Implementation Example 2

As shown in FIG. 4, in one practical example of this invention, after a landslide, a displacement-time curve was constructed based on the real-time monitoring deformation data of the foundation SAR at the rescue site of the landslide disaster. The vertical axis represents displacement in millimeters (mm), and the horizontal axis represents monitoring time in seconds(s).

As illustrated in FIG. 5, with a monitoring period of 30 minutes, a cumulative displacement of the unstable area of the landslide is obtained based on the displacement increment model. By using the displacement-change triangular model, the displacement and time constitute a ternary area within each monitoring period, from which an area-time curve is derived. The vertical axis represents the displacement triangular area, in units of mm·s, while the horizontal axis represents time, in units of seconds. It can be observed from FIG. 5 that since the displacement monitoring data of the unstable area of the landslide began to be obtained, the landslide has entered the constant-velocity deformation stage. When the monitoring period reaches $4.8 \times 10^5$ seconds (8000 minutes), the landslide enters the initial acceleration stage. At this point, the warning level reaches alarm level T3, the first alarm level. Under alarm level T3, rescue personnel should evacuate the disaster area promptly to prevent the occurrence of secondary disasters and ensure the safety of rescue personnel.

Implementation Example 3

As shown in FIG. 6, after a high-level traction landslide disaster, a displacement-time curve was constructed based on the real-time monitoring data of ground deformation supported by Synthetic Aperture Radar (SAR). The vertical axis represents displacement in millimeters (mm), and the horizontal axis represents monitoring time in seconds(s).

As illustrated in FIG. 7, the processing method for deformation monitoring data and displacement-time curves is the same as in Example 1 and Example 2. A monitoring period of 30 minutes is set, and a displacement-area curve is constructed. The vertical axis represents the displacement triangle area in units of mm's, and the horizontal axis represents time, in units of s. It can be observed from FIG. 7 that the landslide has entered an accelerated deformation stage since the start of monitoring with SAR. When the monitoring period reaches $1.18 \times 10^7$ seconds (19,710 minutes), the landslide enters the pre-sliding stage, where secondary disasters are highly prone to occur. At this point, the third alert level T5 should be executed immediately.

The above description only constitutes specific embodiments of the present invention, and the protection scope of the present invention does not limit itself thereto. Any person skilled in the art of the technical field disclosed by the present invention can easily conceive modifications or substitutions, and all of them should be included within the protection scope of the present invention.

What is claimed is:

1. A method for secondary disaster early warning based on ground-based SAR monitoring of deformation data, comprising the following steps:

S1. monitoring an unstable area of a secondary disaster in real-time using ground-based SAR to obtain deformation monitoring data;

S2. based on the deformation monitoring data, obtaining a displacement curve of the secondary disaster unstable area over time, and using it as a displacement-time curve;

S3. setting a monitoring period, and based on the displacement-time curve, constructing a displacement change triangular area model;

S4. constructing an area-time curve based on the displacement change triangular area model, and obtaining a change trend of the area-time curve and a displacement triangular area in the displacement-time curve according to the monitoring period;

S5. dividing a development process of the secondary disaster into an initial deformation stage, a constant velocity deformation stage, and an acceleration deformation stage based on the change trend of the area-time curve and the displacement triangular area;

S6. setting one or more corresponding secondary disaster early warning levels for the initial deformation stage, the constant velocity deformation stage, and the acceleration deformation stage based on the area-time curve; and S7. performing a secondary disaster early warning in a phased manner based on the secondary disaster early warning levels, wherein the step S5 includes the following sub-steps:

S51. calculating the displacement triangular area within each monitoring period for the displacement-time curve, as well as a slope of the displacement-time curve, and using an area and the slope of the displacement-time curve as a secondary disaster deformation rate, wherein the slope of the displacement-time curve corresponds to the change trend of the area-time curve;

S52. when the displacement triangular area is greater than a first threshold, and a change trend of the secondary disaster deformation rate is from small to large and then to small, the displacement-time curve and a corresponding part of the area-time curve are considered as the initial deformation stage;

S53. when the displacement triangular area is less than the first threshold, and the change trend of the secondary disaster deformation rate is unchanged, the displacement-time curve and the corresponding part of the area-time curve are regarded as the uniform deformation stage; and S54. when the displacement triangular area is greater than the first threshold, and the change trend of the secondary disaster deformation rate is gradually increasing, then the displacement-time curve and the corresponding part of the area-time curve are defined as the accelerated deformation stage.

2. The method for secondary disaster early warning based on ground-based SAR monitoring of deformation data described in claim 1, wherein the step S1 includes the following sub-steps:

S11. delineating the unstable area of the secondary disaster;

S12. installing ground-based SAR with the unstable area of the secondary disaster as a monitoring target; and S13. using the ground-based SAR to monitor the unstable area of the secondary disaster in real-time and obtaining the deformation monitoring data.

3. The method for secondary disaster early warning based on ground-based SAR monitoring of deformation data described in claim 1, wherein the step S3 includes the following sub-steps:

S31. establishing a monitoring period for the ground-based SAR in the unstable areas of the secondary disaster;

S32. based on the displacement-time curve, obtaining a cumulative displacement of the unstable area of the secondary disaster within each monitoring period;

S33. constructing a displacement increment model based on the cumulative displacement of the unstable area of the secondary disaster within each monitoring period; and S34. based on the displacement increment model, constructing the displacement change triangular area model.

4. The method for secondary disaster early warning based on ground-based SAR monitoring of deformation data described in claim 1, wherein the step S6 includes the following sub-steps:

S61. according to the area-time curve, setting the secondary disaster early warning level corresponding to the initial deformation stage as an attention level T1;

S62. according to the area-time curve, setting the secondary disaster early warning level corresponding to the constant velocity deformation stage as a warning level T2;

S63. according to the area-time curve, obtaining the displacement triangular area within each monitoring period in the accelerated deformation stage;

S64. when the displacement triangular area in the accelerated deformation stage is less than a second threshold, considering the corresponding part of the area-time curve as the initial acceleration stage, and setting a first one of the one or more corresponding secondary disaster early warning levels as a first alarm level T3;

S65. when the displacement triangular area in the accelerated deformation stage is greater than the threshold, but less than a third threshold, considering the corresponding part of the area-time curve as the middle acceleration stage, and setting a second one of the one or more corresponding secondary disaster early warning levels as the second alarm level T4; and S66. when the displacement triangular area in the accelerated deformation stage is greater than the third threshold, considering the corresponding part of the area-time curve as a critical slip stage, and setting a third one of the one or more corresponding secondary disaster early warning level as a third alarm level T5.

\* \* \* \* \*